(12) United States Patent
Park et al.

(10) Patent No.: US 12,364,366 B2
(45) Date of Patent: Jul. 22, 2025

(54) BLENDER

(71) Applicant: LG ELECTRONICS INC., Seoul (KR)

(72) Inventors: Seungje Park, Seoul (KR); Koonseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 830 days.

(21) Appl. No.: 17/612,947

(22) PCT Filed: Aug. 6, 2020

(86) PCT No.: PCT/KR2020/010373
§ 371 (c)(1),
(2) Date: Nov. 19, 2021

(87) PCT Pub. No.: WO2021/029605
PCT Pub. Date: Feb. 18, 2021

(65) Prior Publication Data
US 2022/0322885 A1    Oct. 13, 2022

(30) Foreign Application Priority Data

Aug. 13, 2019  (KR) .................... 10-2019-0098858

(51) Int. Cl.
*A47J 43/07*   (2006.01)
*A47J 43/046*  (2006.01)

(52) U.S. Cl.
CPC ......... *A47J 43/0777* (2013.01); *A47J 43/046* (2013.01); *A47J 43/0722* (2013.01)

(58) Field of Classification Search
CPC .......................... A47J 43/0777; A47J 43/046
See application file for complete search history.

(56) References Cited

U.S. PATENT DOCUMENTS

| | | | |
|---|---|---|---|
| 2017/0095122 A1* | 4/2017 | Hoare | A23N 1/003 |
| 2018/0020875 A1* | 1/2018 | Kolar | A47J 43/0777 |
| | | | 366/279 |
| 2019/0038078 A1* | 2/2019 | Hunt | A47J 43/046 |

FOREIGN PATENT DOCUMENTS

| | | |
|---|---|---|
| EP | 0046169 A1 | 2/1982 |
| WO | 2016134063 A1 | 8/2016 |
| WO | 2018087030 A1 | 5/2018 |

* cited by examiner

*Primary Examiner* — Elizabeth Insler
(74) *Attorney, Agent, or Firm* — Bryan Cave Leighton Paisner LLP

(57) ABSTRACT

Proposed is a blender in which when the closure of a container lid of a container body is detected, a main body operates. In the blender, when the closure of the container lid of the container body is detected, current is transmitted from a first conductor set of the main body to a second conductor set of the container body, and when the current transmitted through the second conductor set is detected, the main body recognizes the closure of the container lid of the container body and operates.

17 Claims, 15 Drawing Sheets

BLENDER

This application is the National Stage of International Application No. PCT/KR2020/010373, filed Aug. 6, 2020, which claims the benefit of Korean Patent Application No. 10-2019-0098858, filed Aug. 13, 2019, the contents of which are all hereby incorporated herein in their entirety.

TECHNICAL FIELD

The present disclosure relates generally to a blender. More particularly, the present disclosure relates to a blender in which a main body operates when the closure of a container lid of a container body is detected.

BACKGROUND ART

Generally, a blender is a household appliance which chops or crushes food received in a container body by blades rotated by an electric motor, and is also commonly referred to as a food mixer.

In such a blender, the container body is seated on the upper surface of a main body in which the motor is provided, and when the container body is seated, the blades provided in the container body are connected to a rotating shaft of the motor to be rotatable.

After a user puts food in the container body through an open portion of the container body and closes a container lid thereof, the user operates the motor by manipulating the main body to rotate the blades such that the food is crushed.

The container lid closes the open portion of the container body to protect food inside the container body. For safety during the operation of the blender, the blades are not rotated in a state in which the container lid does not close the container body. That is, to prevent accidents due to the blades, the blades are preferably allowed to be rotated only when the closure of the container lid of the container body is detected.

Conventionally, various methods of detecting the closure of a container lid have been proposed.

For example, in prior arts, a push rod physically connecting the container body with the blender body is provided, and when the container lid closes the container body, the container lid presses the push rod. A press detection part of the main body detects the pressing of the container lid, and detects the closure of the container lid.

However, the push rod and the press detection part are required to be separately installed, and the press detection part may be contaminated due to moisture or food that may enter the press detection part.

In addition, the push rod of the container body and the press detection part of the main body are required to be installed at positions corresponding to each other, so there is a problem that the container body is required to be mounted only in a specific direction.

Additionally, the push rod is required to be installed along the container body in a longitudinal direction thereof from the container body to the main body, so the design of the container body made of a transparent material is spoiled.

Recently, in order to solve this problem, a technique of detecting the closure of the container lid of the container body by the main body by using wireless communication or electromagnetic coupling between the container body and the main body has been disclosed.

For example, in European Patent No. EP2548485, when a container lid closes the container body, a blender detecting the closure of the container lid of the container body by the main body by using a wireless communication module is disclosed.

However, in such a prior art, the wireless communication module is required, and a separate power supply is required to be provided in the container body so as to drive the wireless communication module.

For another example, in US Patent Application Publication No. 2018/0020875, an interlocking blending device is disclosed in which a transmitting coil and a receiving coil are disposed in the main body, and a receiving coil and a transmitting coil are disposed in a container body so as to correspond to the transmitting coil and receiving coil, respectively, and when a container lid closes the container body, power is transmitted to the receiving coil of the container body through the transmitting coil of the main body, and in turn, the power is transmitted to the receiving coil of the main body through the transmitting coil of the container body, so that the main body detects the closure of the container lid of the container body.

However, in such a prior art, two coils, that is, a transmitting coil and a receiving coil, are required to be installed in each of the main body and the container body, and a device analyzing power received by the receiving coil of the main body is required.

In addition, two coils are arranged in each of the main body and the container body, and when electric current flows through each coil, induced currents change due to interference between magnetic fields induced in the coils. Accordingly, it is difficult to accurately analyze power received by the receiving coil of the main body.

Furthermore, power is transmitted from the transmitting coil of the main body to the receiving coil of the container body, and, due to the closure of a container lid of the container body, the power is transmitted from the transmitting coil of the container body to the receiving coil of the main body. In order to allow the receiving coil of the main body to receive effective power, high power is required to be transmitted from the transmitting coil of the main body to the receiving coil of the container body.

Additionally, to electrically connect a container lid detection circuit with the main body, a conductive member is installed along the transparent container body, and thus the design of the transparent container body is spoiled.

DISCLOSURE

Technical Problem

The present disclosure is intended to propose a blender in which when the closure of a container lid of a container body is detected after the container body is seated on a main body, the main body operates.

The present disclosure is intended to propose a blender in which the closure of a container lid of the container body is detected through current transmission between conductor sets disposed in the main body and the container body, respectively.

The present disclosure is intended to propose a blender in which even if the container body is mounted to the main body in any direction, the closure of a container lid of the container body is reliably detected.

The present disclosure is intended to propose a blender in which when the container body is seated on the main body, impact is relieved and stability is secured.

The present disclosure is intended to propose a blender in which the design of the container body made of a transparent material is maintained.

The present disclosure is intended to propose a blender in which the closure of a container lid of the container body is accurately detected with low power.

The present disclosure is intended to propose a blender in which conductors mounted to the main body and the container body, respectively, are configured to be removable therefrom.

The objectives of the present disclosure are not limited to the objectives mentioned above, and other objectives not mentioned may be clearly understood by those skilled in the art to which the present disclosure belongs from the following description.

Technical Solution

In the blender of the present disclosure, current transmission between a first conductor set installed in a main body and a second conductor set installed in a container body may be performed, and the main body may detect the closure of a container lid of the container body by detecting current transmitted from the first conductor set.

In the blender of the present disclosure, according to the closure of the container lid of the container body, current transmission between the first conductor set and the second conductor set may be performed.

In the blender of the present disclosure, when the container lid of the container body is closed, a detection module disposed in the container body may detect the closure of the container lid, and when the closure of the container lid is detected by the detection module, current transmission between the first and second conductor sets may be performed.

In the blender of the present disclosure, the first conductor set may include a first conductor configured to transmit current to the second conductor set and a second conductor configured to receive current from the second conductor set.

In the blender of the present disclosure, the second conductor set may include a third conductor configured to receive current from the first conductor and a fourth conductor configured to transmit current to the second conductor.

In the blender of the present disclosure, the first to fourth conductors may include metal conductors or conductivity rubbers, and when the container lid of the container body is closed, current transmission may be performed between the metal conductors or the conductivity rubbers.

In the blender of the present disclosure, the first conductor may be configured to have a ring shape on the upper surface of the main body, and the second conductor may be configured at the inside or outside of the ring of the first conductor and to have a ring shape on the same surface as the first conductor such that the second conductor has the same center point as the first conductor. An insulating material may be disposed between the first and second conductors.

In the blender of the present disclosure, the third conductor may be configured to have a ring shape on the lower surface of the container body, and the fourth conductor may be configured at the inside or outside of the ring of the third conductor and to have a ring shape on the same surface as the third conductor such that the fourth conductor has the same center point as the third conductor. An insulating material may be disposed between the third and fourth conductors.

In the blender of the present disclosure, the main body may include a power supply part configured to supply current to the first conductor and a detection part configured to detect current transmitted from the second conductor, and when the container lid of the container body is closed, the current supplied to the first conductor by the power supply part may be transmitted to the third conductor.

In the blender of the present disclosure, the first conductor and the third conductor may be in contact with each other in at least a portion there, and the second conductor and the fourth conductor may be in contact with each other in at least a portion thereof.

In the blender of the present disclosure, the first and second conductors and the third and fourth conductors may be configured to be attached to and detached from the main body and the container body, respectively.

In the blender of the present disclosure, the main body may further include a reed switch configured to detect whether the container body is seated, and when the closure of the container lid is detected in a state in which the reed switch detects the seating of the container body, the power supply part may supply current.

The blender according to the present disclosure may further include the container lid having a triggering member provided inside a side surface thereof, and the detection module attached to the container body may operate such that current transmission between the first and second conductor sets is performed when the triggering member approaches the detection module within a predetermined distance range.

In the blender of the present disclosure, the detection module may include a switch changed from a turned-off state to a turned-on state when the triggering member approaches the detection module within the predetermined distance range, and when the switch is turned on, current supplied by the power supply part may be transmitted between the first and second conductor sets.

In the blender of the present disclosure, the detection module mounted to the upper part of the container body and the second conductor set mounted to the lower part of the container body may be electrically connected to each other through a conductive member made of a transparent material disposed from the upper part of the container body to the lower part thereof in the longitudinal direction of the container body, so the transparency of the container body may be maintained.

In the blender of the present disclosure, a transparent electrode film (ITO) may be used as the conductive member, and the conductive member may be disposed in the longitudinal direction of the transparent container body from the upper part of the container body to the lower part thereof.

In the blender of the present disclosure, the first end of the transparent electrode film may be electrically connected to the detection module by a first connector which is detachable, and the second end of the transparent electrode film may be electrically connected to the second conductor set by a second connector which is detachable.

In the blender of the present disclosure, when current output through the first conductor set is detected, the main body may operate.

Advantageous Effects

The blender according to the present disclosure has the following effects.

First, in the blender of the present disclosure, after the container body is seated on the main body and the closure of the container lid of the container body is detected, the main body may operate, thereby enabling the blender to be safely used.

Second, in the blender of the present disclosure, the conductor sets may be disposed on the main body and the container body, respectively, and the closure of the container lid of the container body may be detected through current transmission between the conductor sets, thereby detecting the closure of the container lid through such a simple structure.

Third, in the blender of the present disclosure, although the container body is mounted to the main body in any direction, the closure of the container lid of the container body may be reliably detected.

Fourth, in the blender of the present disclosure, according to an embodiment, conductivity rubbers may be applied to the main body and the container body, thereby relieving impact and securing stability when seating the container body on the main body.

Fifth, in the blender of the present disclosure, the transparent electrode film (ITO) may be attached to the transparent container body to perform electrical connection, thereby maintaining the design of the transparent container body.

Sixth, in the blender of the present disclosure, the conductor sets applied for current transmission may be attached to and detached from the container body and the main body, respectively, thereby enabling the conductor sets to be easily and simply mounted, replaced, and repaired.

MODE FOR INVENTION

Figure 1:
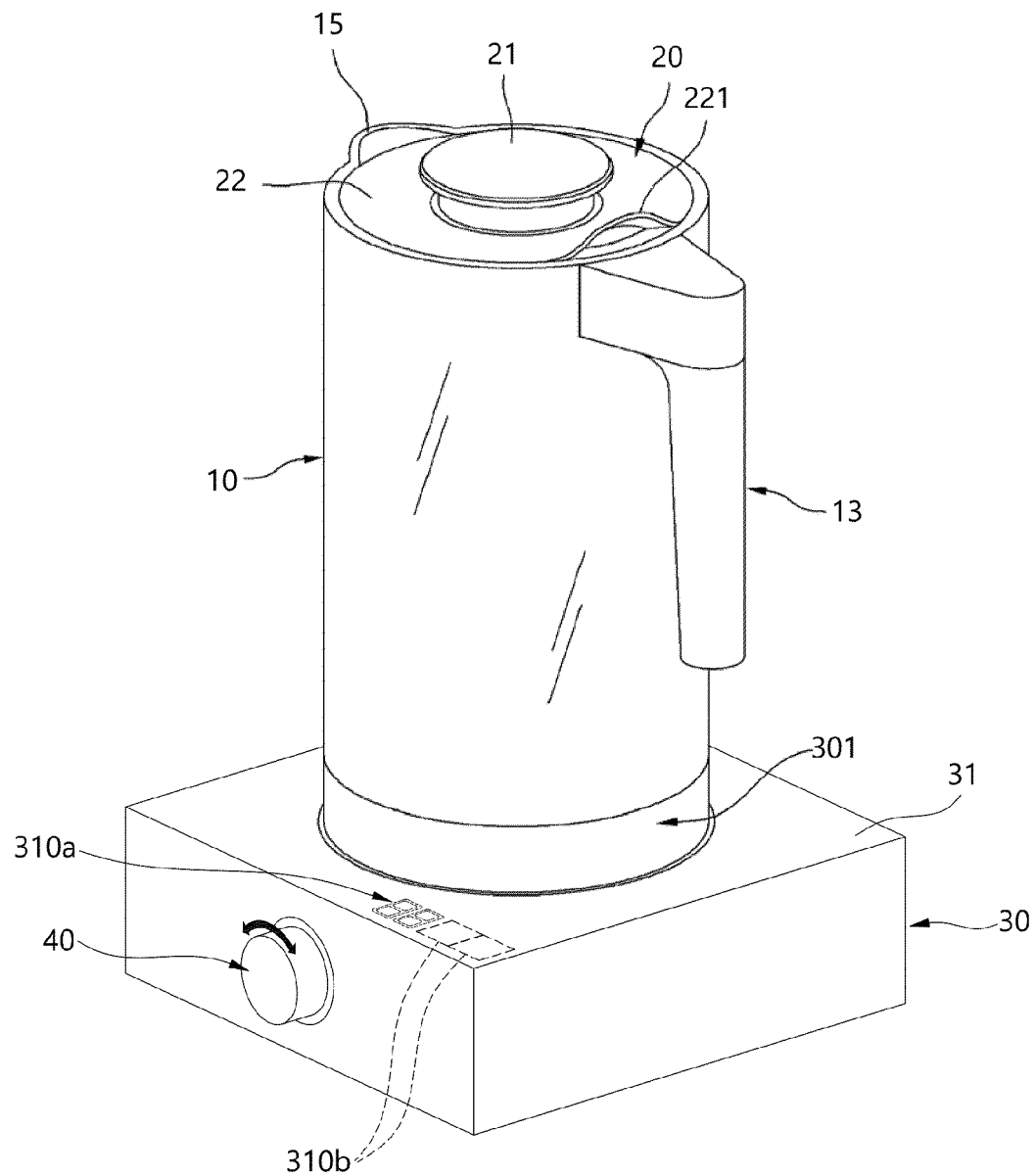
FIG. 1 is a perspective view of an exterior of a blender according to an embodiment of the present disclosure.

Advantages and features of the present disclosure and a method of achieving them will become apparent by referring to embodiments described below in detail in conjunction with the accompanying drawings. However, the present disclosure is not limited to the embodiments disclosed below and may be implemented in various different forms. The present embodiments are only provided to fully inform those of ordinary skill in the art to which the present disclosure belongs of the scope of the invention so that the disclosure of the present disclosure is complete. The present disclosure is defined by the scope of the claims. Like reference numerals refer to like elements throughout the specification.

Hereinafter, a blender of the present disclosure will be described in detail with reference to the accompanying drawings.

Figure 2:
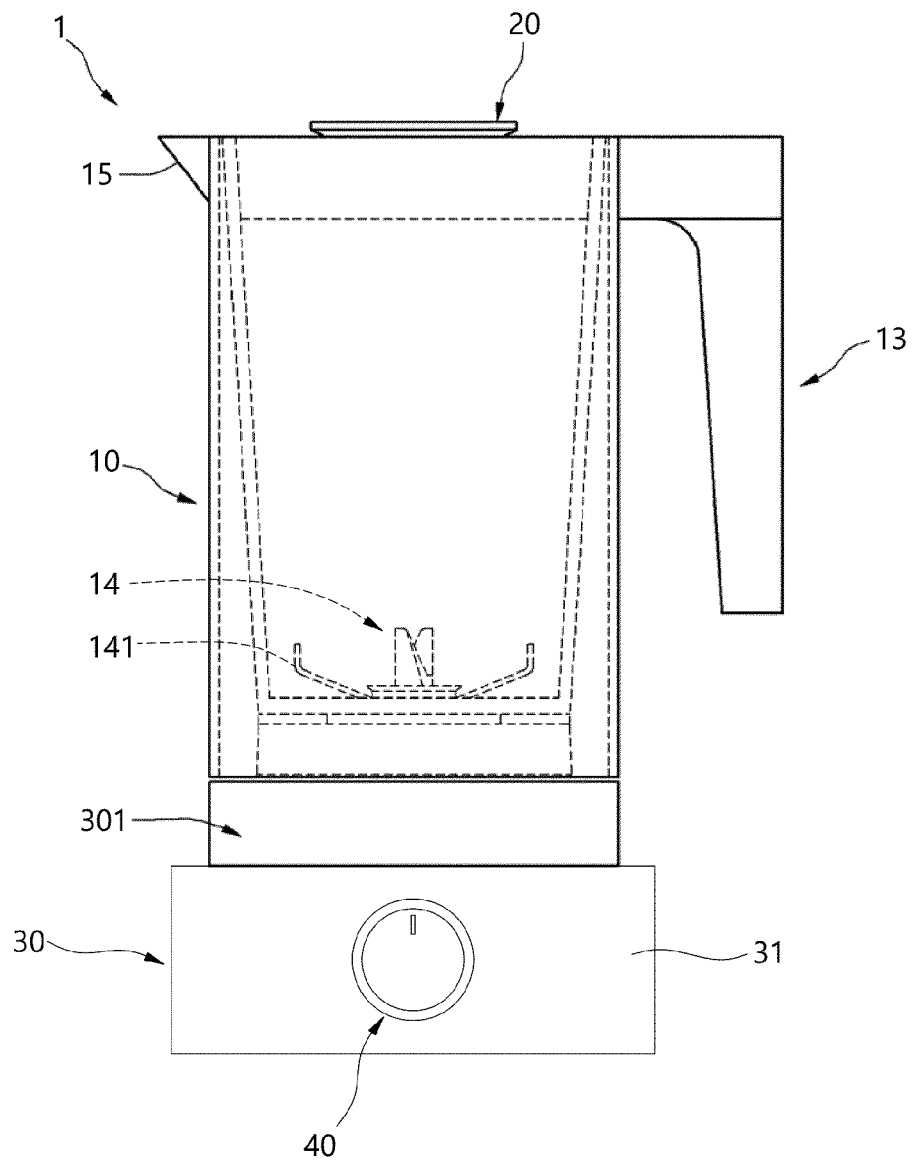
FIG. 2 is a front view of the blender.
Figure 3:
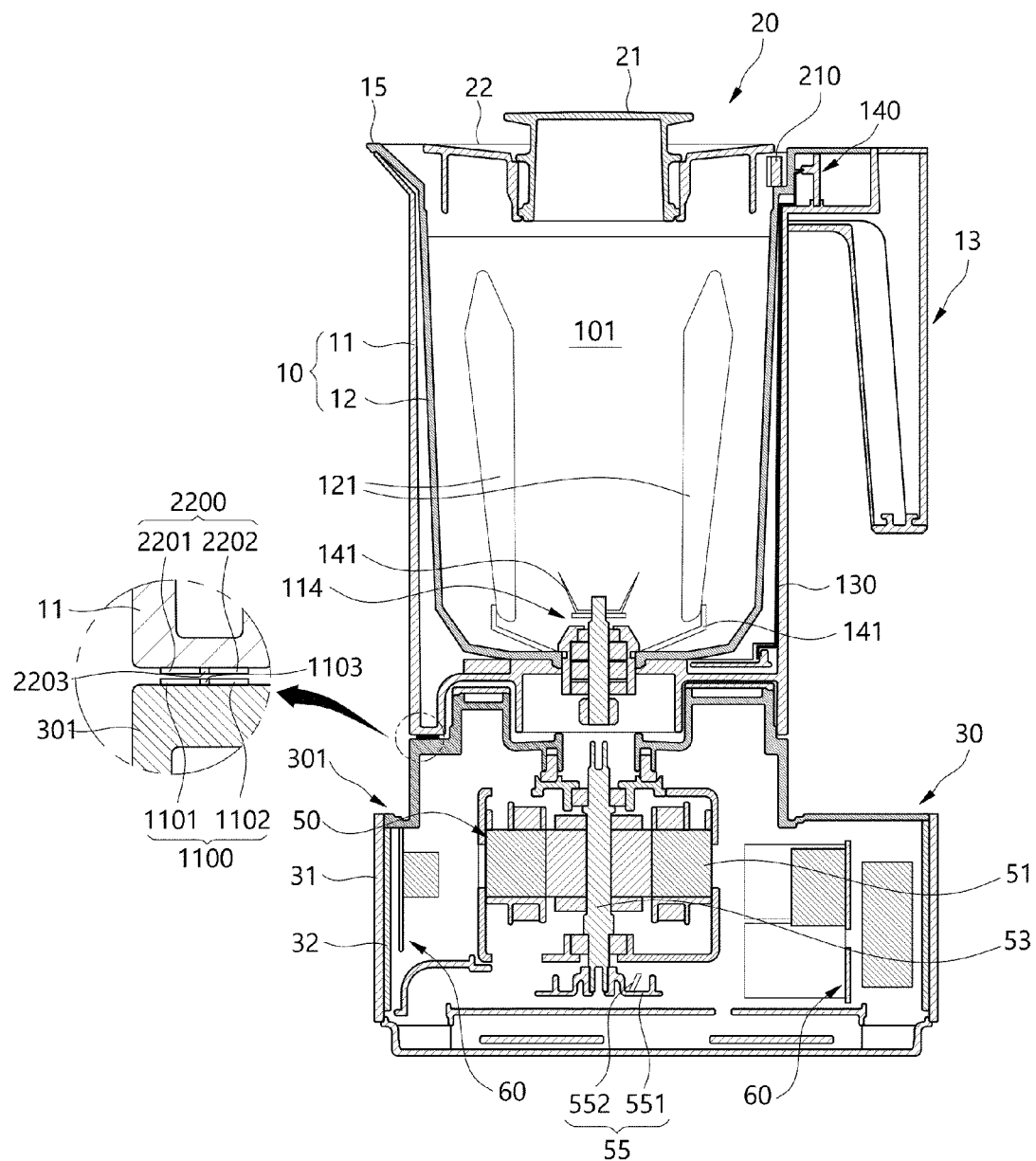
FIG. 3 is a vertical sectional view of the blender.

FIG. 1 is a perspective view of an exterior of a blender according to an embodiment of the present disclosure, FIG. 2 is a front view of the blender, and the blender, and FIG. 3 is a vertical sectional view of the blender.

Referring to the drawings, the blender 1 according to the embodiment of the present disclosure may include a main body 30 disposed on a foundation surface, and a container body 10 seated on the upper part of the main body 30.

A motor assembly 50 for operating the blender 1, electrical devices including a control PCB module 60, and components may be disposed inside the main body 30.

The main body 30 may be provided with a manipulation part 40 and 310b for manipulating the operation of the blender 1, and a display part 310a for displaying the operation thereof.

The main body 30 may be configured to have a hexahedral shape as a whole, and a seating part 301 may be provided on the upper surface of the main body 30 so as to seat the container body 10 on the seating part 301. The seating part 301 may be configured such that the container body 10 is attached to and detached from the seating part 301 in a vertical direction.

The exterior of the main body 30 may be constituted by an outer casing 31 which is made of metal or has a metal texture, and the outer casing 31 may be configured to have a hexahedral shape having an open lower surface.

An inner casing 32 may be formed in the outer casing 31, and space in which the motor assembly 50 and the control PCB module 60 are mounted may be defined inside the inner casing 32.

A knob 40 may be provided on the front surface of the main body 30 such that a user sets the operation of the blender 1. The knob 40 may protrude from the front surface of the main body 30 and may manipulate and set the operation of the blender 1 by being rotated.

The display part 310a may be provided on the upper surface of the main body 30 so as to display the operation state of the blender 1. The display part 310a may be configured as at least one seven-segment display.

A touch manipulation part 310b may be provided on the upper surface of the main body 30 such that the start or stop of the operation of the blender 1 can be manipulated. In order to manipulate the blender 1, the manipulation part 40 and 310b may include at least any one of the knob 40 and a touch module (not shown).

The seating part 301 may be formed on the upper surface of the main body 30. The seating part 301 may protrude from the upper surface of the main body 30, and a portion of the seating part 301 may be inserted into the lower surface of the container body 10 so as to stably support the container body 10.

When the container body 10 is seated on the seating part 301, the motor assembly 50 may be coupled to a blade module 14 provided in the container body 10 and may transmit a rotational force to the blade module 14.

The seating part 301 may have an appearance formed of the same material as the outer casing 31. The seating part 301 may be formed of a metal material or a material having a metal texture to have a sense of unity with the appearance of the main body 30 as a whole.

The motor assembly 50 may be mounted inside the main body 30 located under the seating part 301. The motor assembly 50 is intended to rotate the blade module 14 installed inside the container body 10, and may drive a motor in the motor assembly 50 to rotate the blade module 14 at high speed.

The motor assembly 50 may control the rotation speed of the motor according to the manipulation of the knob such that the rotation speed of the blade module 14 can be controlled.

A first conductor set 1100 may be disposed at a side of the upper surface of the seating part 301. The first conductor set 1100 may be configured to have a ring shape as a whole.

The first conductor set 1100 may be disposed at the side of the upper surface of the seating part 301 such that the first conductor set 1100 is exposed to the outside. In addition, the first conductor set 1100 may be attached to and detached from the seating part 301, and thus may be conveniently checked, repaired, and replaced.

The first conductor set 1100 may include at least two conductors.

The upper end of the motor assembly 50 may be connected to the blade module 14 located in the container body 10. A cooling fan 55 may be provided on the lower end of the motor assembly 50.

The cooling fan 55 may be configured such that multiple fan blades 552 are radially disposed on the upper surface of a fan plate 551 having a shape of a plate, and during the operation of the motor assembly 50, may rotate simultaneously with the blade module 14 such that cold air introduced in the axial direction of the cooling fan 55 is radially discharged, so the flow of the cold air in the main body 30 may be effectively forced.

Multiple control PCB modules 60 may be disposed on the inner wall surface of the inner casing 32 constituting the inner side surface of the main body 30. The control PCB module 60 may include multiple control PCB modules, and the multiple control PCB modules may be disposed on the circumference of the inner side surface of the main body 30, that is, on the front, rear, left, and right surfaces thereof, respectively.

The control PCB module 60 may include multiple controllers (not shown) capable of controlling the operation of the main body 30 and the container body 10. These controllers may be provided by mounting a MYCOM (a microprocessor) to a PCB substrate in the form of an on-chip, and may include a program and software necessary for controlling the main body 30 and the container body 10.

The container body 10 may be configured as a cylindrical shape corresponding to the outer diameter of the seating part 301, and may have an open upper surface, so the container body may have space therein in which food is received.

The container body 10 may be formed of a transparent material such as glass or materials like glass through which the inner portion of the container body 10 can be seen.

The container body 10 may have the blade module 14 provided at the center of the inner lower surface thereof. The blade module 14 may include multiple blades 141 and may be connected to the motor assembly 50. Accordingly, when the motor assembly 50 operates in a state in which the container body 10 is seated on the main body 30, the blades 141 may rotate and grind or cut food contained inside the container body 10.

Multiple inner guides 121 may be provided in the container body 10 to guide food that is rotated. Each of the inner guides 121 may extend by a predetermined length upward from the lower end of the inner side surface of the container body 10.

Meanwhile, a second conductor set 2200 may be disposed on a side of the lower surface of the container body 10. The second conductor set 2200 may be formed to have a ring shape as a whole.

The second conductor set 2200 may be disposed on a side of the lower surface of the container body 10 such that the second conductor set 2200 is exposed to the outside. Furthermore, the second conductor set 2200 may be attached to and detached from the container body 10, and thus may be conveniently checked, repaired, and replaced.

A spout 15 through which crushed food is poured may protrude from the upper end of the container body 10, and a handle 13 may be provided at a side facing the spout by protruding therefrom.

The handle 13 may protrude from the upper end of the container body 10 to the outside and then may extend downward such that a user can lift or carry the container body 10. The protruding end portion of the handle 13 may be located on the same extension line as the side end of the main body 30.

A detection module 151 configured to detect the closure of a container lid 20 may be installed on the inner side of the container body 10 to which the handle 13 is coupled. The detection module 151 may be embodied as a PCB substrate, and may include a switch.

The detection module 151 may allow the switch provided therein to be operated according to the closure of the container lid 20 of the container body 10, and may detect the closure of the container lid 20, and then whether to perform current transmission between the first and second conductor sets 1100 and 2200 may be determined.

That is, when the detection module 151 detects the closure of the container lid 20, current transmission between the first and second conductor sets 1100 and 2200 may be performed, but when the detection module 151 does not detect the closure of the container lid 20, current transmission between the first and second conductor sets 1100 and 2200 may not be performed.

The detection module 151 and the second conductor set 2200 may be electrically connected to each other by a conductive member 161. The conductive member 161 may be electrically connected to the detection module 151 in a first end thereof, and may be electrically connected to the second conductor set 2200 in a second end thereof by extending from the upper end of the container body 10 to the lower end thereof.

The detection module 151 and the second conductor set 2200 may be provided with first and second connectors 152 and 143 (see FIGS. 7 and 10), respectively, for effective electrical connection to the conductive member 161.

By using the first and second connectors 152 and 143, the detection module 151 and the second conductor set 2200 may be easily attached to and detached from the conductive member 161. Accordingly, the detection module 151, the second conductor set 2200, and the conductive member 161 may be more easily attached to and detached from the blender 1, and replacement thereof may also be easy.

The conductive member 161 may be in contact with the inner or outer surface of the container body 10. When being in contact with the outer surface, the conductive member 161 may be coated with a predetermined coating material to be fixedly attached to the outer surface.

The conductive member 161 may be formed of a transparent material such that the design of the container body 10 of the transparent material can be maintained.

The blender 1 according to the embodiment of the present disclosure may include the container lid 20.

The container lid 20 may shield the open upper surface of the container body 10, and a user may open the open upper surface of the container body 10 by separating the container lid 20 from the container body 10.

The open upper surface of the container body 10 may be closed (referred to as the closure of a container lid) or opened (referred to as the opening of the container lid) by the container lid 20 such that the open upper surface of the container body 10 may be closed and opened.

The container lid 20 may include a container lid handle 21.

A triggering member 210 turning on/off the switch installed in the detection module 151 may be arranged on the inner surface of a side of the container lid 20. When the triggering member 210 approaches the detection module 151 within a predetermined distance, the switch provided in the detection module 151 may be turned on. Contrarily, when the triggering member 210 moves away from the predetermined distance, the switch may be turned off.

Meanwhile, as described above, the blender 1 according to the embodiment of the present disclosure may be operated by the manipulation of the knob 40 and the touch manipulation part 310b, but may be configured to be selectively operated only under a specific condition.

For example, the blender 1 according to the embodiment may be operated only in the state in which the container lid 20 closes the container body 10, that is, in the state of the closure of the container lid. This is because when the blender 1 operates in the open state of the container lid, accidents may occur due to the blades 141, which are sharp, and food contained in the container body 10 may be ejected to the outside.

Figure 4:
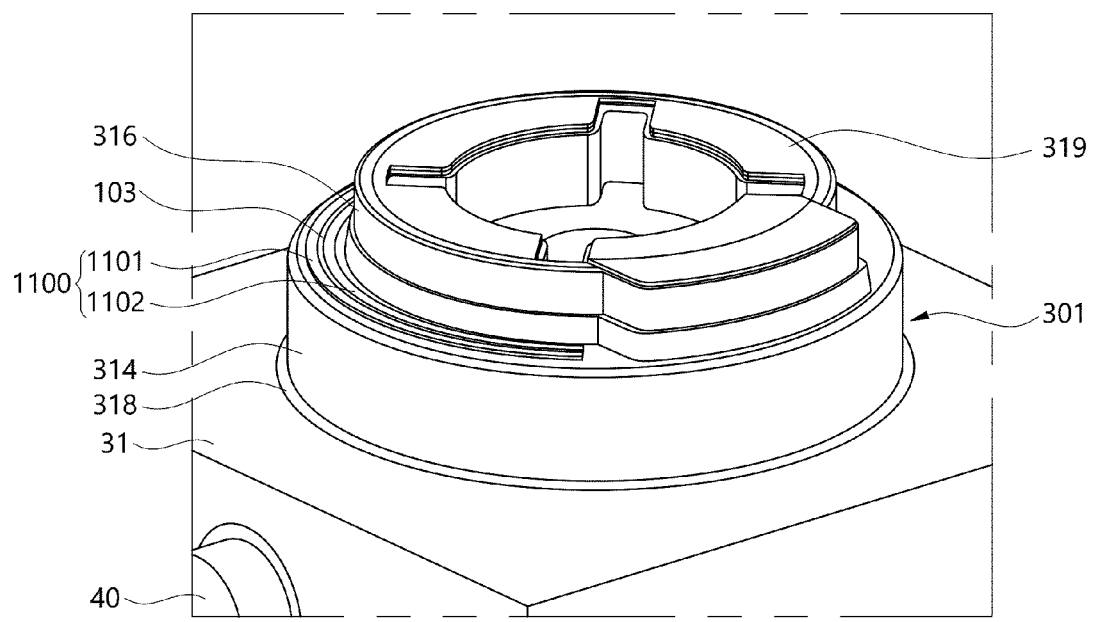
FIG. 4 is a perspective view of a main body which is a component of the blender according to the embodiment of the present disclosure.
Figure 5:
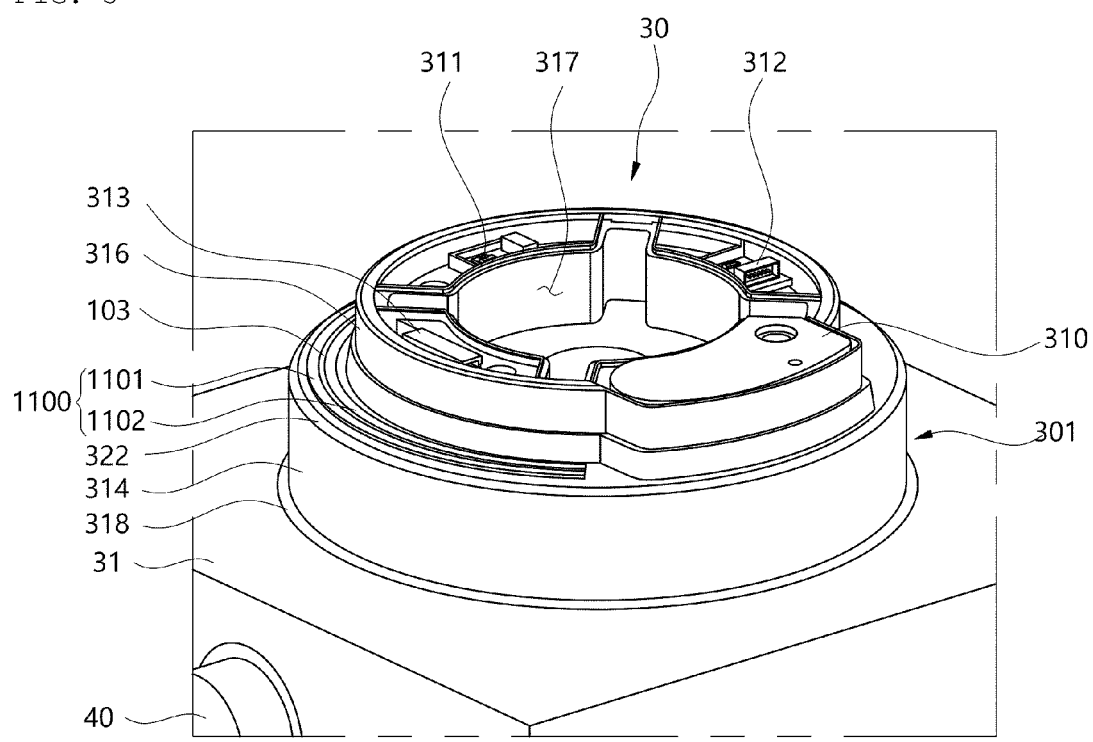
FIG. 5 is a view illustrating a state in which an upper cover for a second seating part decoration is removed from the main body of FIG. 4.

FIG. 4 is a perspective view of the main body which is a component of the blender according to the embodiment of the present disclosure, and FIG. 5 is a view illustrating a state in which the upper cover of the second seating part decoration is removed from the main body of FIG. 4.

Referring to the drawings, the main body 30 according to the embodiment of the present disclosure may be configured to have a cuboid shape, and may have a structure in which the seating part 301 protrudes on the upper surface of the main body 30 to seat the container body 10 thereon, and the knob 40 by which the operation of the blender 1 is controlled is disposed on the front surface of the main body 30.

As for the overall structure of the main body 30, the outer casing 31 may be mounted to the outer side of the main body 30 to constitute the exterior of the main body 30. The outer casing 31 may be formed of a metal material such as stainless steel and may be formed of materials having plate shapes, which are bent and joined to each other, thereby providing the shape of a very clean and rigid appearance.

The seating part 301 may have a two-step shape, and an entire appearance thereof may be constituted by a first seating part decoration 314, a second seating part decoration 316, and a lower decoration 315.

The first seating part decoration 314 and the second seating part decoration 316 may be formed of the same material as the outer casing 31 or of a material having the same texture as the outer casing 31.

The lower decoration 315 may be formed of a plastic or rubber material, and may be formed in a ring shape. In addition, during the mounting of the first seating part decoration 314, the lower part 315 may fill space between the first seating part decoration 314 and the outer casing 31 such that no gap is visible.

A first exterior material may be mounted to the circumference of the side surface of the first seating part decoration 314. Such a first exterior material may be formed of a stainless material and may protect the first seating part decoration 314.

The first seating part decoration 314 and the second seating part decoration 316 may have predetermined heights and may be formed in ring shapes as a whole when viewed from the top. The second seating part decoration 316 may have a smaller diameter than the first seating part decoration 314, and may be disposed at the center of the first seating part decoration 314.

The first conductor set 1100 may be disposed at the outskirt of the second seating part decoration 316 disposed at the center of the upper surface 325 of the first seating part decoration 314.

The first conductor set 1100 may include at least two conductors. In the drawings, for example, first conductor set 1100 is illustrated to include a first conductor 1101 and a second conductor 1102.

The first and second conductors 1101 and 1102 may include metal conductors. For example, the metal conductors may be applied as long as the metal conductors are materials having electrical conductivity, such as copper, iron, platinum, and aluminum.

In addition, the first and second conductors 1101 and 1102 may include conductivity rubbers. The conductivity rubbers applied to the embodiment may include materials having both elasticity and electrical conductivity.

The first conductor 1101 may be configured to have a ring shape as a whole on the upper surface of the main body 30, and the second conductor 1102 may be configured at the inside or outside of the ring of the first conductor 1101 and may be configured on the same surface as the first conductor 1101 such that the second conductor 1102 and the first conductor 1101 have the same center points. A spacing 1103 is formed between the first conductor 1101 and the second conductor 1102.

The second seating part decoration 316 may have a ring shape as a whole when seen from the top and may be configured to have a portion protruding laterally.

An insertion space 317 may be defined in the center portion of the upper surface of the second seating part decoration 316, and a first seating groove 321 and a second seating groove 322 may be formed on the circumference of the upper surface of the second seating part decoration 316. A third seating groove 323 and a fourth seating groove 324 may be selectively formed on the upper surface of the second seating part decoration 316.

A PCB module 310 may be seated in the first seating groove 321. A light receiving module 311 may be seated in the second seating groove 322. A Hall sensor 312 may be selectively seated in the third seating groove 323 so as to detect the type of the container body 10 seated on the main body 30, and a reed switch 313 may be seated in the fourth seating groove 324 so as to detect whether the container body 10 is seated.

When the container body 10 is seated on the main body 30, the Hall sensor 312 may detect a magnet (not shown) attached to the lower part of the container body 10 according to the type of the container body 10 and may detect the type of the container body 10. The magnetic force of a magnet may be different for each type of the container body 10, and accordingly, the type of the container body 10 may be detected by using the magnitude of a magnetic force detected by the Hall sensor 312.

When the container body 10 is seated on the main body 30, the reed switch 313 may detect a magnet (not shown) mounted to the lower part of the container body 10 and may detect whether the container body 10 is seated. When the magnet approaches the reed switch 313, the reed switch 313 may be turned on to detect the approaching of the magnet, and through the detection of the approaching of the magnet, the seating of the container body 10 may be detected.

The PCB module 310, the light receiving module 311, the Hall sensor 312, and the reed switch 313 may be attached to and detached from the first, second, third, and fourth seating grooves 321, 322, 323, and 324, respectively.

In a state in which the PCB module 310 and the light receiving module 311 are seated, and in a state in which the Hall sensor 312 and the reed switch 313 are selectively seated, an upper cover 319 for the second seating part decoration may be coupled to the upper part of the second seating part decoration 316.

The upper cover 319 for the second seating part decoration may hold and protect the PCB module 310, the light receiving module 311, the Hall sensor 312, and the reed switch 313, and may be formed of a material having a signal transmission function such that the light receiving module 311 can receive a signal through the upper cover 319.

In a state in which the upper cover 319 is coupled to the second seating part decoration 316, a second exterior material may be mounted to the circumference of each of the side surfaces of the upper cover 319 and the second seating part decoration 316.

Figure 6:
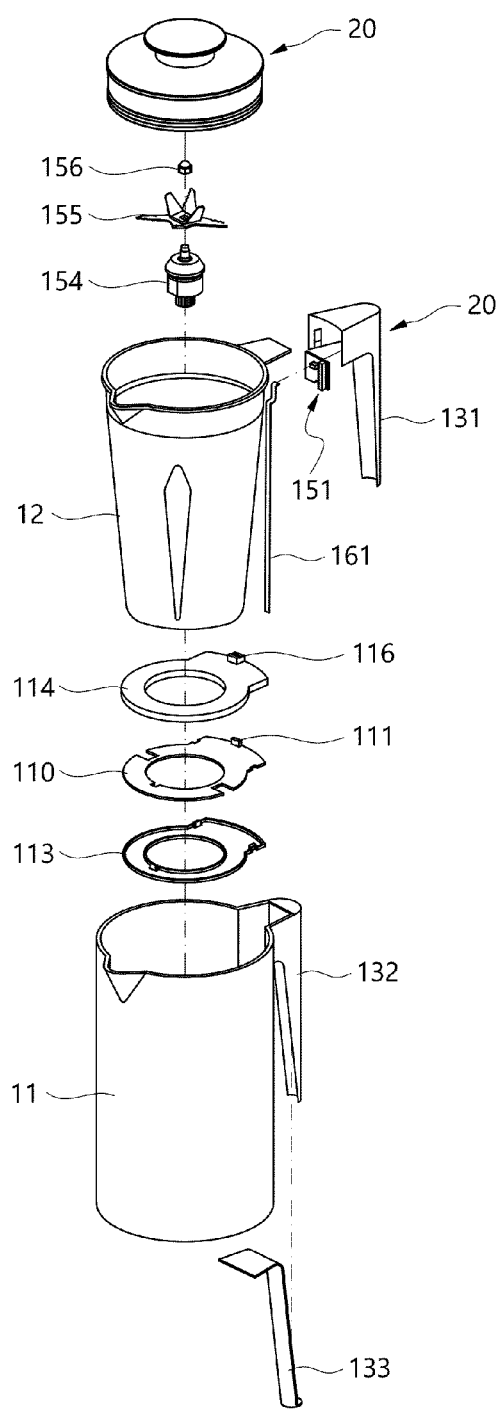
FIG. 6 is an exploded perspective view of a container body which is a component of the blender according to the present disclosure.
Figure 7:
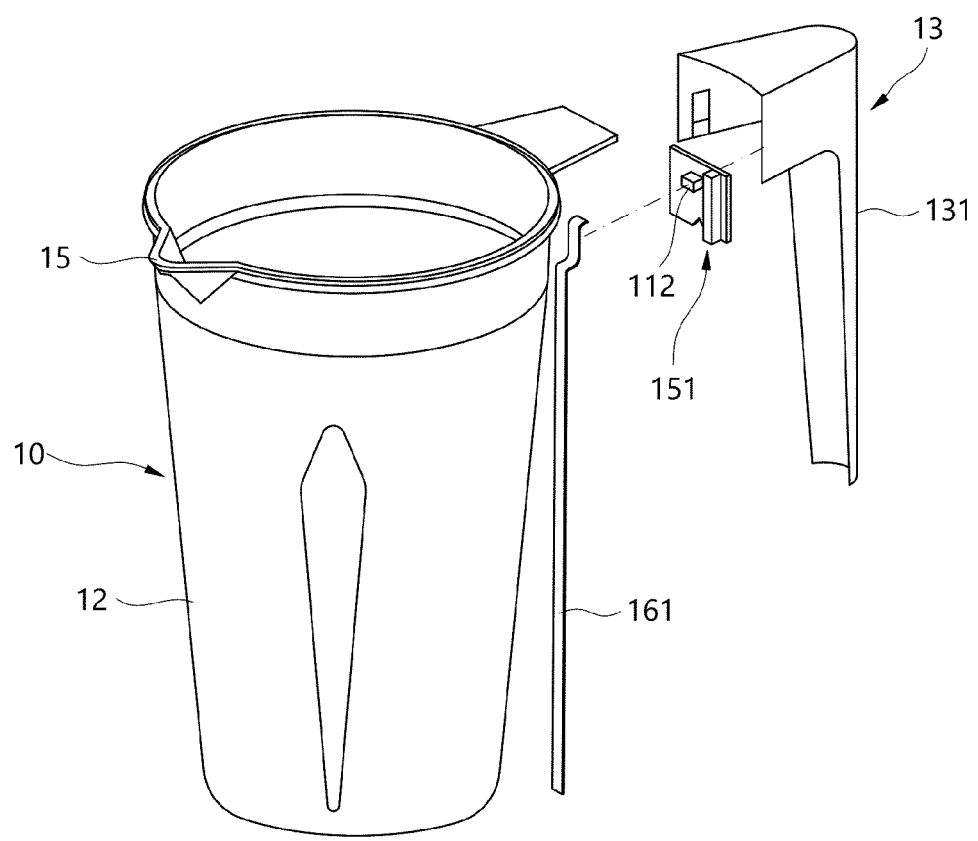
FIG. 7 is a perspective view of an inner container body according to the present disclosure seen at a different angle.
Figure 8:
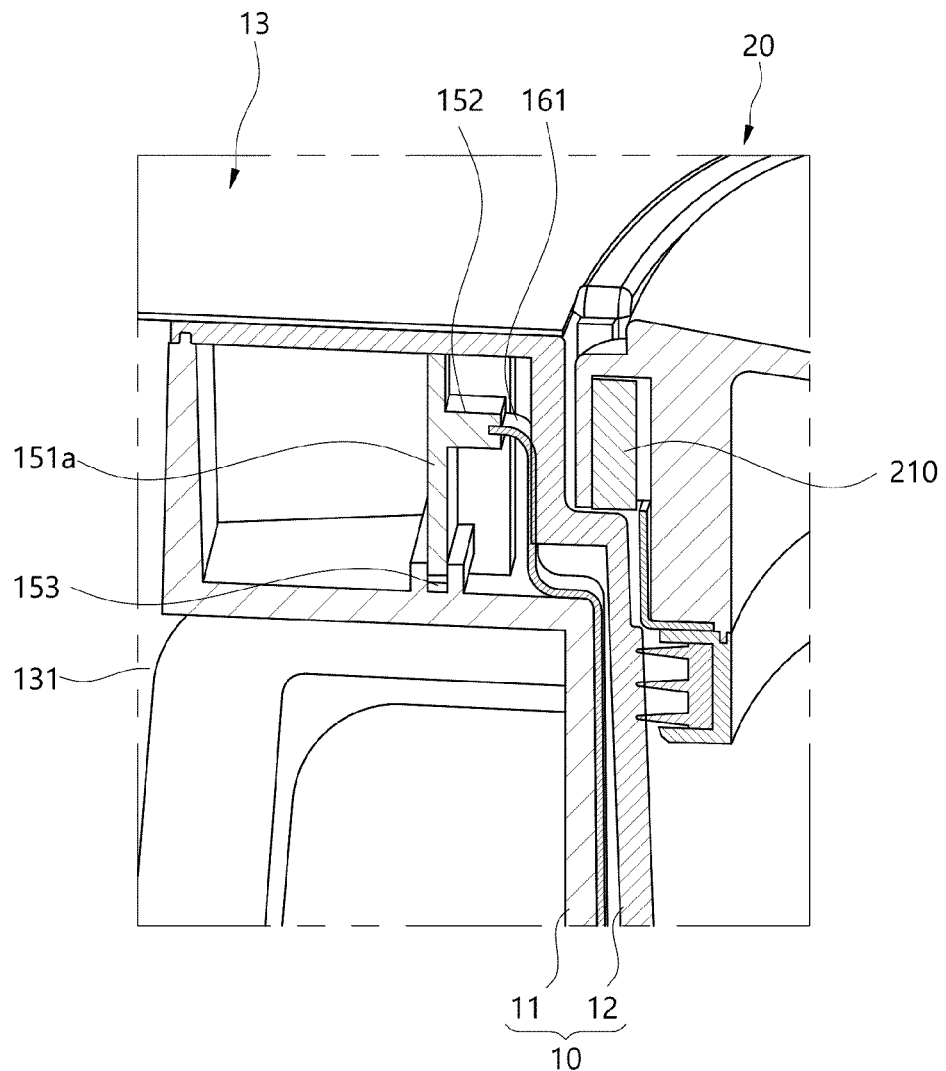
FIG. 8 is a detailed view of a detection module of the container body.
Figure 9:
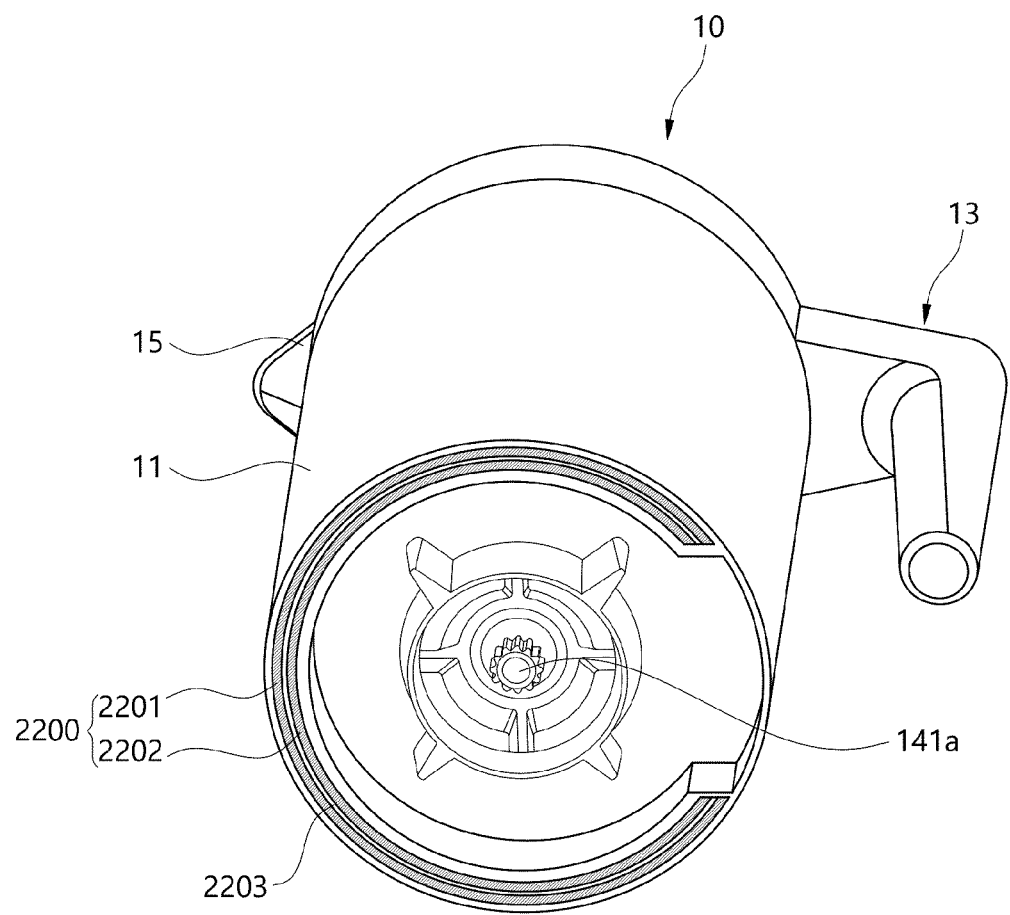
FIG. 9 is a perspective view of the container body seen from a lower side thereof.
Figure 10:
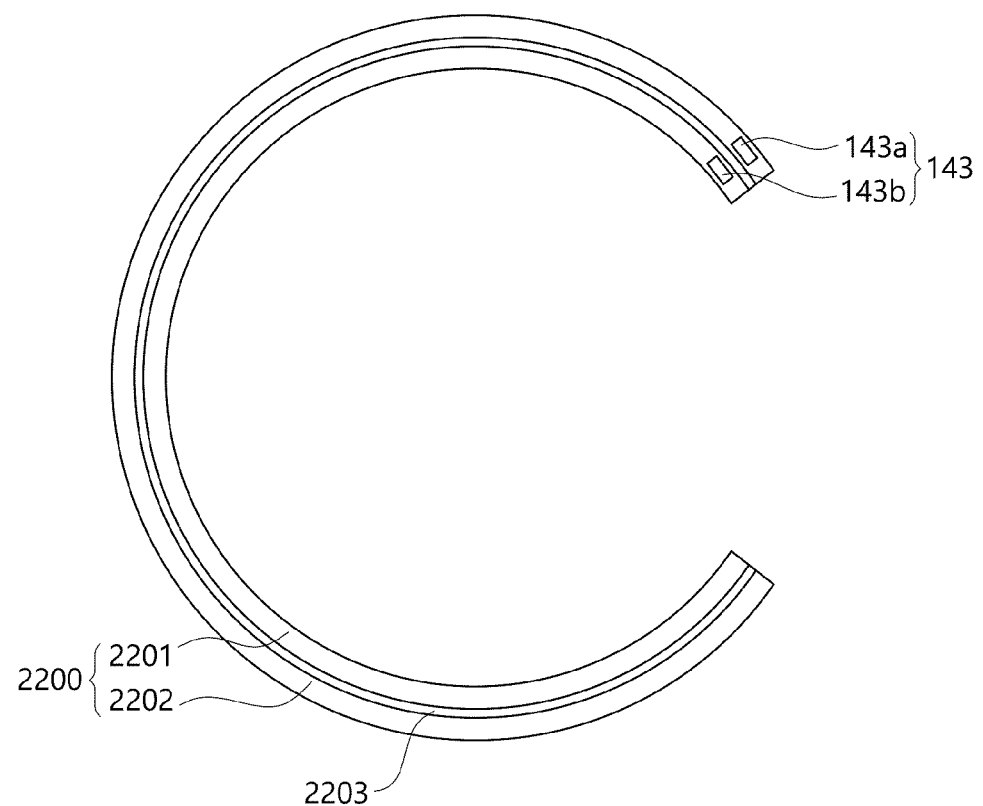
FIG. 10 is a detailed view of a conductor set mounted to the lower part of the container body.

FIG. 6 is an exploded perspective view of the container body which is a component of the blender according to the present disclosure, FIG. 7 is a perspective view of an inner container body according to the present disclosure seen at a different angle, FIG. 8 is a detailed view of the detection module of the container body, FIG. 9 is a perspective view of the container body seen from a lower side thereof, and FIG. 10 is a detailed view of a conductor set mounted to the lower part of the container body.

Referring to the drawings, the container body 10 according to the embodiment may be configured in a cylindrical shape having the open upper surface. The blade module 14 may be mounted to the lower surface of the container body 10, and the container lid 20 may be detachably mounted to the open upper surface of the container body 10.

The container body 10 may be formed of a material such as glass, Tritan, or transparent plastic, etc. to check the state of food therein during the operation of the blender 1.

The container body 10 may include an outer container body 11 constituting an outer shape thereof, and the inner container body 12 having inner space in which food is received.

The inner container body 12 and the outer container body 11 may be coupled to each other and may constitute the overall shape of the container body 10 such that the container body 10 has a double wall structure.

The inner container body 12 may be spaced apart from the outer container body 11, which may define space between the outer container body 11 and the inner container body 12. The inner container body 12 may have a diameter decreasing gradually downward. The lower part of the inner container body 12 may be configured to be inclined or round toward the blade module 14 such that food in the container body 10 may be directed to the blade module 14.

The outer container body 11 may have a cylindrical shape having upper and lower ends which have the same outer diameters, respectively, such that the appearance of the container body 10 looks neat.

The outer diameter of the outer container body 11 may be configured to be the same as the outer diameter of the seating part 301, and while the container body 10 is mounted to the main body 30, the main body 30 and the container body 10 may be seen as being integrated with each other.

A receiving part (not shown) of the main body may be formed on the lower surface of the outer container body 11.

The receiving part of the main body may have space recessed upward from the lower surface of the outer container body 11 such that the second seating part decoration 316 described above can be inserted into the space.

Due to the coupling of the receiving part of the main body to the second seating part decoration 316, the state of the container body 10 mounted to the seating part 301 may be maintained.

A middle handle 132 may be formed at a side of the upper end of the outer container body 11 by protruding therefrom. When the middle handle formed by protruding, an inner space may be defined at the side of the upper end of the outer container body 11 to receive the detection module 151.

An outer handle 131 may be coupled to the outer side of the middle handle 132, and an inner handle 133 may be coupled to the inner side of the middle handle 132 so as to constitute the handle 13 as a whole.

The upper end of the inner container body 12 may be configured to have an inclined surface 122 having an inner diameter decreasing gradually downward. Accordingly, in a process in which the container lid 20 is inserted to the open upper surface of the container body 10, the container lid 20 may be configured to seal the inner container body 12 while being gradually brought into close contact with the inner container body 12.

The upper inclined surface of the inner container body 12 may be configured from the upper end of the container body 10 to the upper end of the inner guide 121, and may be configured along the circumference of the inner surface of the container body 10.

The inner guide 121 may be formed on the inner side surface of the inner container body 12. The inner guide 121 may extend from the inclined surface 122 to the bottom surface of the inner container body 12.

The blade module 14 may be disposed at the inner lower part of the inner container body 12, and may be configured such that multiple blades 141 are inserted into the upper part of a base 141*a* and may be fastened thereto by a nut 141*b* from the upper side.

The second conductor set 2200 may be configured on the lower surface of the outer container body 11.

The second conductor set 2200 may include at least two conductors. In the embodiment, the second conductor set 2200 may, for example, include a third conductor 2201 and a fourth conductor 2202.

The third conductor 2201 may be configured to have a ring shape as a whole on the lower surface of the container body 10, and the fourth conductor 2202 may be configured at the inside or outside of the ring of the third conductor 2201 and on the same surface as the third conductor 2201 such that the fourth conductor 2202 has the same center point as the third conductor 2201. A spacing 2203 is formed between the third conductor 2201 and the fourth conductor 2202.

The third and fourth conductors 2201 and 2202 may include metal conductors or conductivity rubbers as the first and second conductors 1101 and 1102 do.

In another embodiment, the first and second conductors 1101 and 1102 may include conductivity rubbers and the third and fourth conductors 2201 and 2202 may include metal conductors.

The second connector 143a and 143b may protrude on a side of the upper surface of the third conductor 2201 and the fourth conductor 2202 such that the third conductor 2201 and the fourth conductor 2202 are electrically connected with the conductive member 161.

The detection module 151 may be installed on the inner side of the upper end portion of the container body 10 to which the handle 13 is coupled. The detection module 151 may be embodied as a PCB and may include a switch which can be turned on/off as described later. Such a switch may be switched on only under a specific condition.

The detection module 151 may detect whether the container lid 20 closes the container body 10. Specifically, when the container lid 20 closes the container body 10, the switch located inside the detection module 151 may be turned on by the triggering member 210 installed inside the container lid 2.

Accordingly, in the embodiment, when the switch in the detection module 151 is turned on, the detection module 151 may detect the closure of the container lid 20.

The detection module 151 may be seated in a groove 153 formed thereunder and may maintain stability thereof. The first connector 152 may be mounted to the detection module 151 such that the detection module 151 is electrically connected with the conductive member 161.

The conductive member 161 may be disposed between the outer container body 11 and the inner container body 12. The conductive member 161 may be disposed by extending in the longitudinal direction of the container body 10 from the upper part of the container body 10 to the lower part thereof.

The conductive member 161 may be formed of a transparent material to secure and maintain the transparency of the outer container body 11 and the inner container body 12 formed of a material glass, such as Tritan, or transparent plastic, etc. In the embodiment, the conductive member 161 may include a transparent electrode film (ITO).

The first end of the conductive member 161 may be electrically connected to the detection module 151 by the first connector 152, and the second end of the conductive member 161 may be electrically connected to the first and second conductors 2201 and 2202 by the second connector 143. Specifically, the first end of the conductive member 161 may be connected to the switch provided in the detection module 151, and the second end of the conductive member 161 may be connected to the first and second conductors 2201 and 2202.

The first end of the conductive member 161 may be electrically connected to the detection module 151 by the first connector 152, and the second end of the conductive member 161 may be electrically connected to the second conductor set 2200 by the second connector 143.

The conductive member 161 may be in contact with the inner surface of the outer container body 11 or with the outer surface of the inner container body 12 and may extend from the upper part of the container body to the lower part thereof.

The upper end part of the conductive member 161 may be installed by bending in a section according to the shapes of the outer container body 11 and the inner container body 12.

The triggering member 210 may be mounted to the inside of a side surface of the container lid 20 such that the triggering member 210 is located at a position corresponding to the detection module 151. When the container lid 20 closes the container body 10, the triggering member 210 may be installed to approach the detection module 151 within a predetermined distance. When the triggering member 210 approaches the detection module 151 within a predetermined distance due to the closure of the container lid 20, the switch of the detection module 151 may be turned on.

Specifically, when the container body 10 is closed due to the closure of the container lid, the triggering member 210 installed inside the container lid 20 may approach the detection module 151 within a predetermined distance, and the switch of the detection module 151 may be turned on. When the container lid 20 is opened, the triggering member 210 of the container lid 20 may move away by a predetermined distance from the detection module 151 and the switch of the detection module 151 may be turned off.

Figure 11:
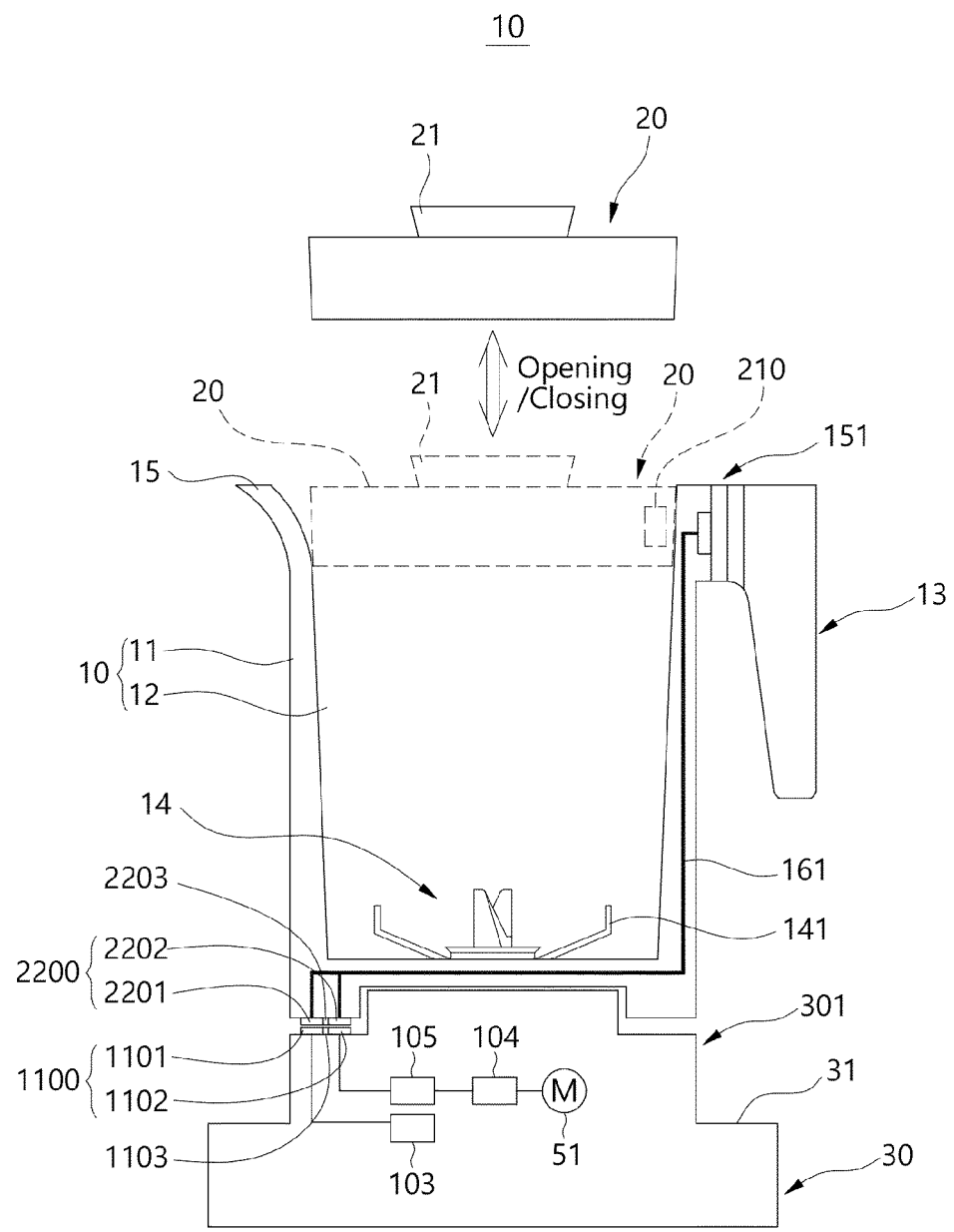
FIG. 11 is a view schematically illustrating some components of the blender to describe the operation of the blender according to the embodiment of the present disclosure.
Figure 12:
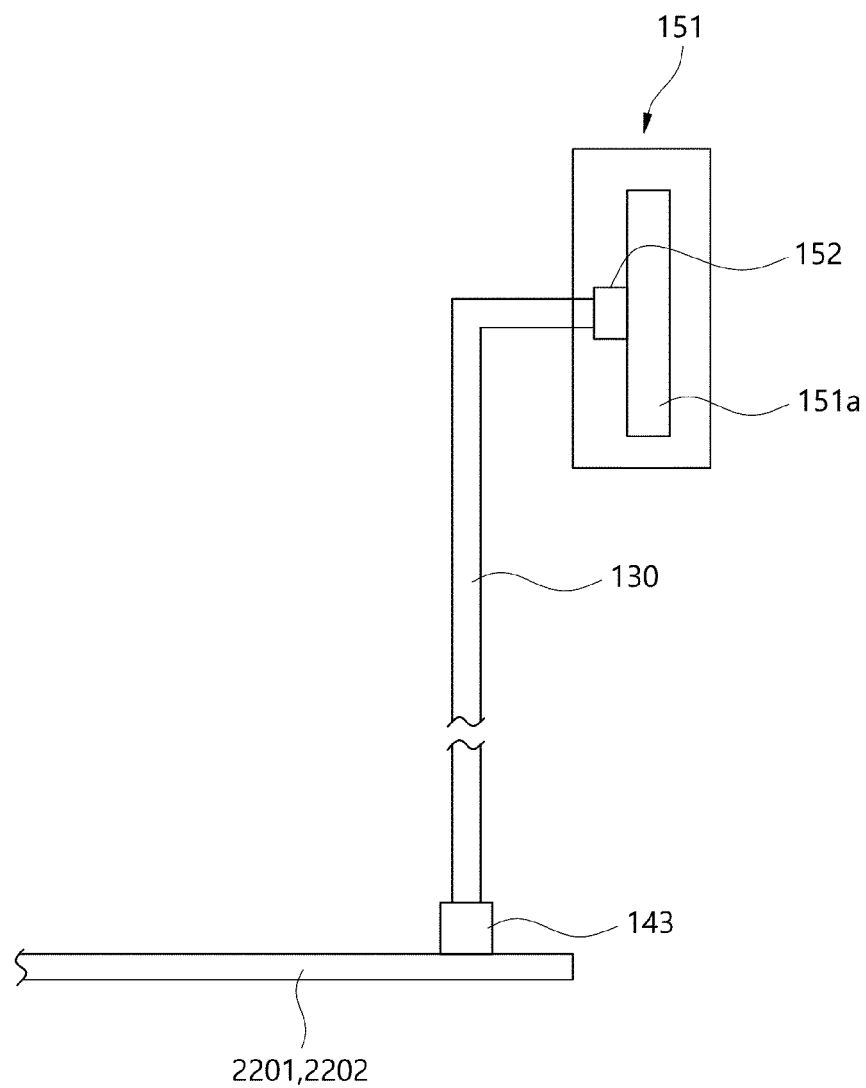
FIG. 12 is a view illustrating the connection of a conductive member according to the embodiment of the present disclosure.

FIG. 11 is a partial sectional view schematically illustrating some components of the blender to describe the operation of the blender according to the embodiment of the present disclosure, and FIG. 12 is a view illustrating the disposition of the conductive member in the container body according to the embodiment of the present disclosure.

Referring to the drawings, the first conductor set 1100 may be installed on a side of the upper part of the main body 30 of the blender 1 according to the embodiment.

The first conductor set 1100 may include at least two conductors. In the embodiment, for example, the first conductor set 1100 may include the first conductor 1101 and the second conductor 1102.

The first conductor 1101 may be configured to have a ring shape as whole on the upper surface of the main body 30, and the second conductor 1102 may be configured at the inside or outside of the ring of the first conductor 1101 and on the same surface as the first conductor 1101 such that the second conductor 1102 has the same center point as the first conductor 1101.

The first conductor 1101 and the second conductor 1102 may be installed on the upper surface of the seating part 301 of the main body 30, and may be preferably installed to be exposed to the outside.

The first and second conductors 1101 and 1102 may include metal conductors or conductivity rubbers.

The main body 30 may include a control module 340 provided therein. The control module 340 may include a power supply part 341 capable of apply current to the first conductor 1101, and a detection part 342 configured to detect current output from the second conductor 1102.

The control module 340 may be mounted to the control PCB module 60 described above by having a shape of the PCB substrate. In addition, the control module 340 may control the power supply part 341 and the detection part 342 by a control signal output from the controller (not shown). The controller may recognize the closure of the container lid of the container body 10 by using current detected by the detection part 342.

The second conductor set 2200 may be installed on a side of the lower surface of the container body 10.

The second conductor set 2200 may include at at least two conductors. In the embodiment, for example, the second conductor set 2200 may include the third conductor 2201 and the fourth conductor 2202.

The third conductor 2201 may be configured to have a ring shape as a whole on the lower surface of the container body 10, and the fourth conductor 2202 may be configured at the inside or outside of the ring of the third conductor 2201 and on the same surface as the third conductor 2201 such that the fourth conductor 2202 has the same center point as the third conductor 2201.

The third conductor 2201 and the fourth conductor 2202 may be installed on the lower surface of the container body 10, and may be preferably installed to be exposed to the outside. In the embodiment, for example, the third conductor 2201 and the fourth conductor 2202 may be installed on the lower surface of the outer container body 11.

The third and fourth conductors 2201 and 2202 may include metal conductors or conductivity rubbers.

When the container body 10 is seated on the main body 30, the third conductor 2201 and the fourth conductor 2202 disposed on the lower surface of the container body 10 may be in contact with the first conductor 1101 and the second conductor 1102, respectively, disposed on the upper surface of the main body 30.

Specifically, when the container body 10 is seated on the main body 30, the first conductor 1101 of the main body 30 may be in contact with the third conductor 2201 of the container body 10, and the second conductor 1102 of the main body 30 may be in contact with the fourth conductor 2202 of the container body 10.

In this case, according to the type of embodiment, the first conductor 1101 and the third conductor 2201 may be in contact with each other in at least a portion thereof, and the second conductor 1102 and the fourth conductor 2202 may be in contact with each other in at least a portion thereof.

Current may be transmitted between the first and third conductors 1101 and 2201 and the second and fourth conductors 1102 and 2202.

The detection module 151 may be mounted to the upper end part of the container body 10. In the embodiment, in the upper end part the container body 10, the detection module 151 may be mounted between the outer container body 11 and the inner container body 12. The detection module 151 may be embodied with the switch 151a to be described later mounted to a PCB substrate. The detection module may include a capacitor connected in series to the switch 151a as required.

The triggering member 210 may be mounted on a side of the side surface of the container lid 20. When the container lid 20 closes the container body 10, the triggering member 210 may be disposed to approach the detection module 151 located substantially at the height as the triggering member 210 within a predetermined distance.

When the container lid 20 closes the container body 10, the triggering member 210 of the container lid 20 may approach the detection module 151 within a predetermined distance, and the switch 151a of the detection module 151 may be turned on. Accordingly, the detection module 151 may function to detect the closure of the container lid.

In the embodiment, the triggering member 210 may be a magnetic body, and the switch 151a may be a reed switch.

In the embodiment, the reed switch may be turned off in an initial stage, and when the magnetic body approaches the reed switch within a predetermined distance, the reed switch may be turned on.

As described above, when the reed switch is turned on, current may be transmitted between the first and third conductors 1101 and 2201 and between the second and fourth conductors 1102 and 2202. This current may be detected by the detection part 342.

The main body 30 may include the control module 340 therein. The control module 340 may include the power supply part 341 configured to supply current to the first conductor 1101, and the detection part 342 configured to detect the current transmitted from the second conductor 1102.

Accordingly, when the reed switch is turned on, the first conductor set 1100, the control module 340, the second conductor set 2200, and the detection module 151 may be connected to each other in series to form a closed circuit. In this case, current supplied by the power supply part 341 may be supplied to the first conductor 1101 of the first conductor set 1100, and the current of the first conductor 1101 may be transmitted to the detection part 342 through the third conductor 2201, the reed switch 151a, the fourth conductor 2202, and the second conductor 1102.

The control module 340 may be connected to the motor assembly 50 described above, and when the detection part 342 detects current, a motor 51 of the motor assembly 50 may be operated. The controller 104 may be mounted to the control PCB module 60 described above.

The detection module 151 and the third and fourth conductors 2201 and 2202 may be electrically connected to each other through the transparent conductive member 161. Specifically, the transparent conductive member 161 may electrically connect the switch 151a of the detection module 151 with the third and fourth conductors 2201 and 2202.

In the embodiment, the conductive member 161 may include a transparent electrode film (ITO). The transparent electrode film (ITO) may be a transparent material capable of conducting current.

The transparent electrode film (ITO) may be installed at various positions. According to the embodiment, the transparent electrode film may be installed between the outer container body 11 and the inner container body 12. The transparent electrode film may be preferably attached to the inner surface of the outer container body 11 or on the outer surface of the inner container body 12.

For another example, the transparent electrode film (ITO) may be attached to the outer surface of the outer container body 11, and in this case, the transparent electrode film (ITO) may be coated with a transparent coating material such that the transparent electrode film is protected from the outside.

The transparent electrode film (ITO) may be disposed vertically in the longitudinal direction of the container body 10 from the detection module 151 of the upper part of the container body 10 to the third and fourth conductors 2201 and 2202 of the lower part of the container body 10. Due to the application of such a transparent electrode film (ITO), the transparency of the transparent container body 10 may be maintained.

Meanwhile, when the container body 10 is seated on the main body 30, the power supply part 341, the first conductor 1101, the third conductor 2201, the switch 151a, the fourth conductor 2202, and the detection part 342 may be electrically connected to each other in series.

Accordingly, according to the turn on/off of the switch 151a, current may be transmitted or cut off between the first conductor 1101 and the third conductor 2201, and between the second conductor 1102 and the fourth conductor 2202.

Figure 13:
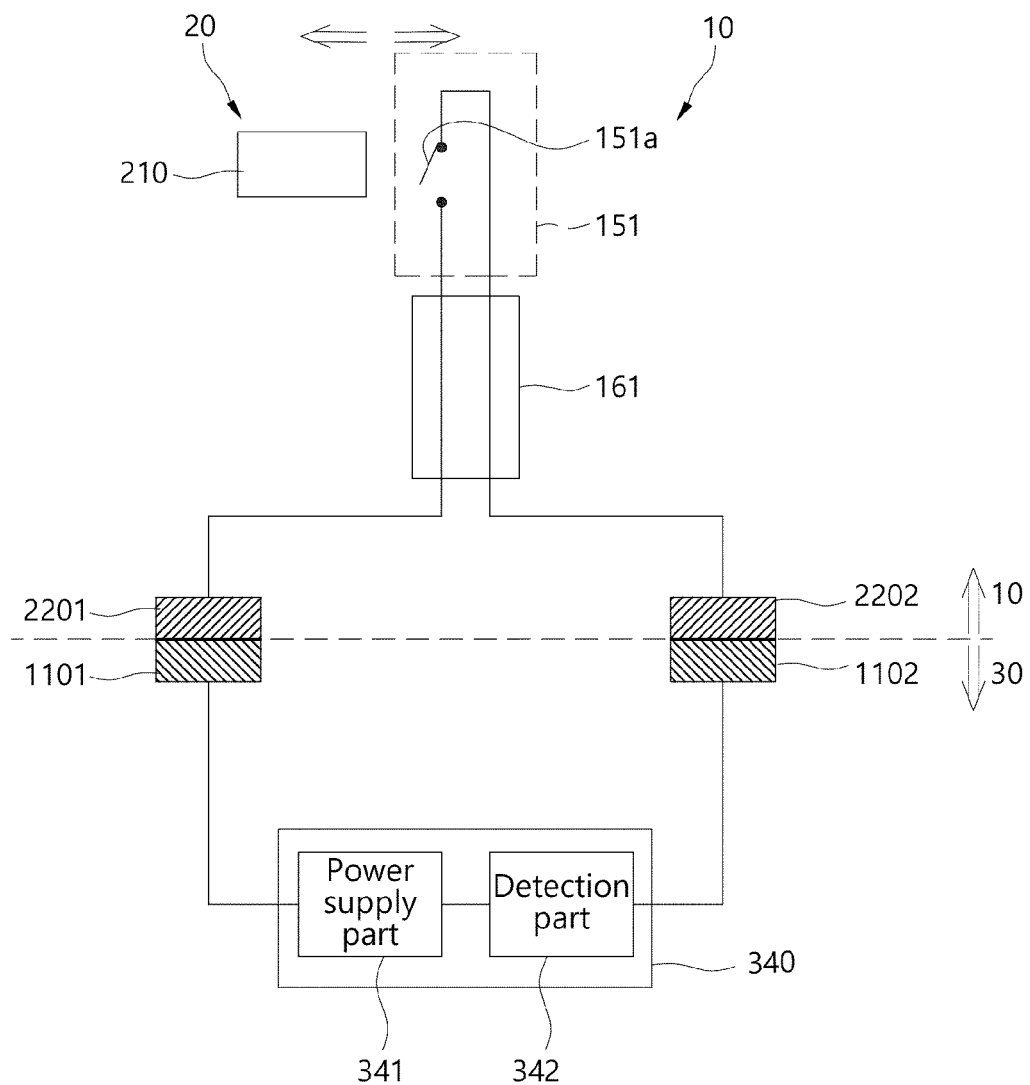
FIG. 13 is an equivalent circuit diagram of components for the operation of the blender.
Figure 14:
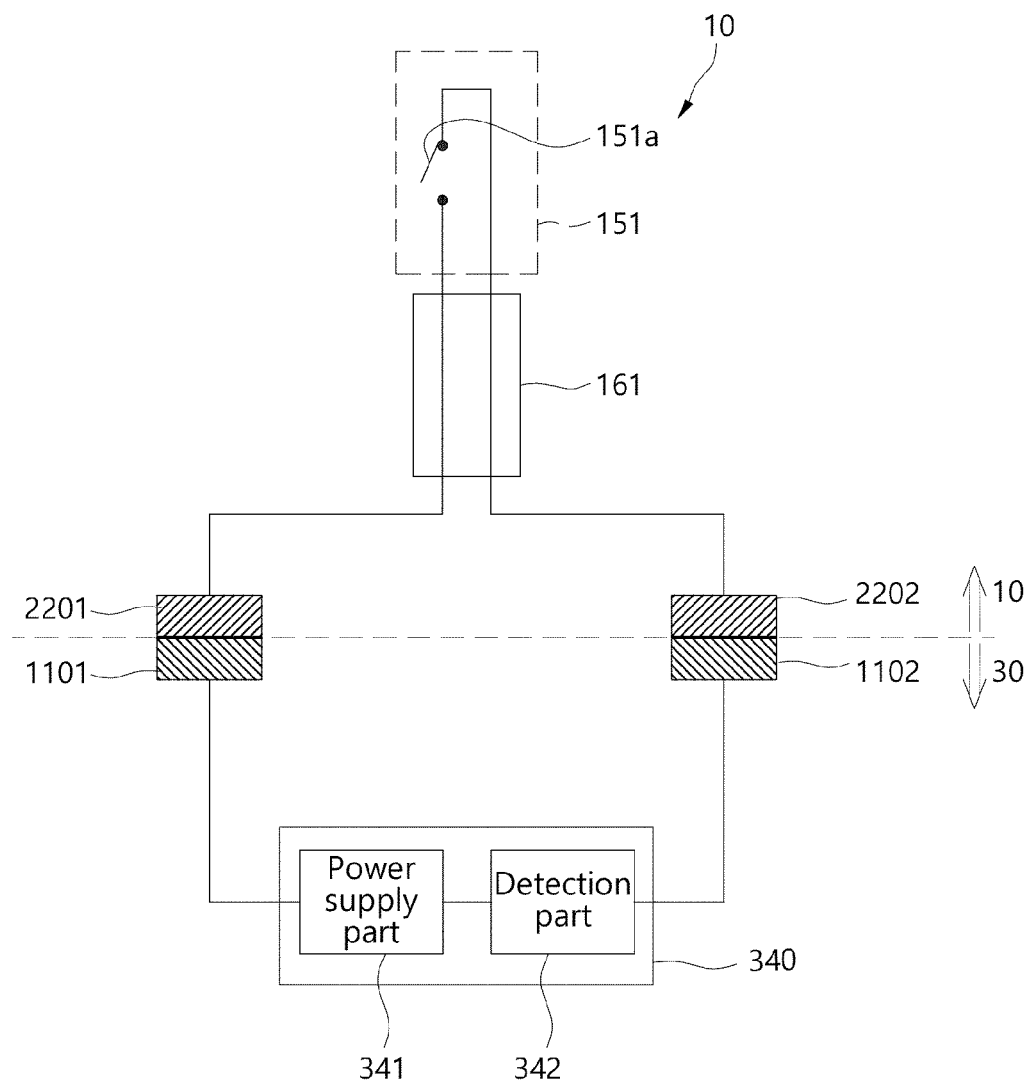
FIG. 14 is an operation diagram according to the opening of a container lid in the equivalent circuit diagram.
Figure 15:
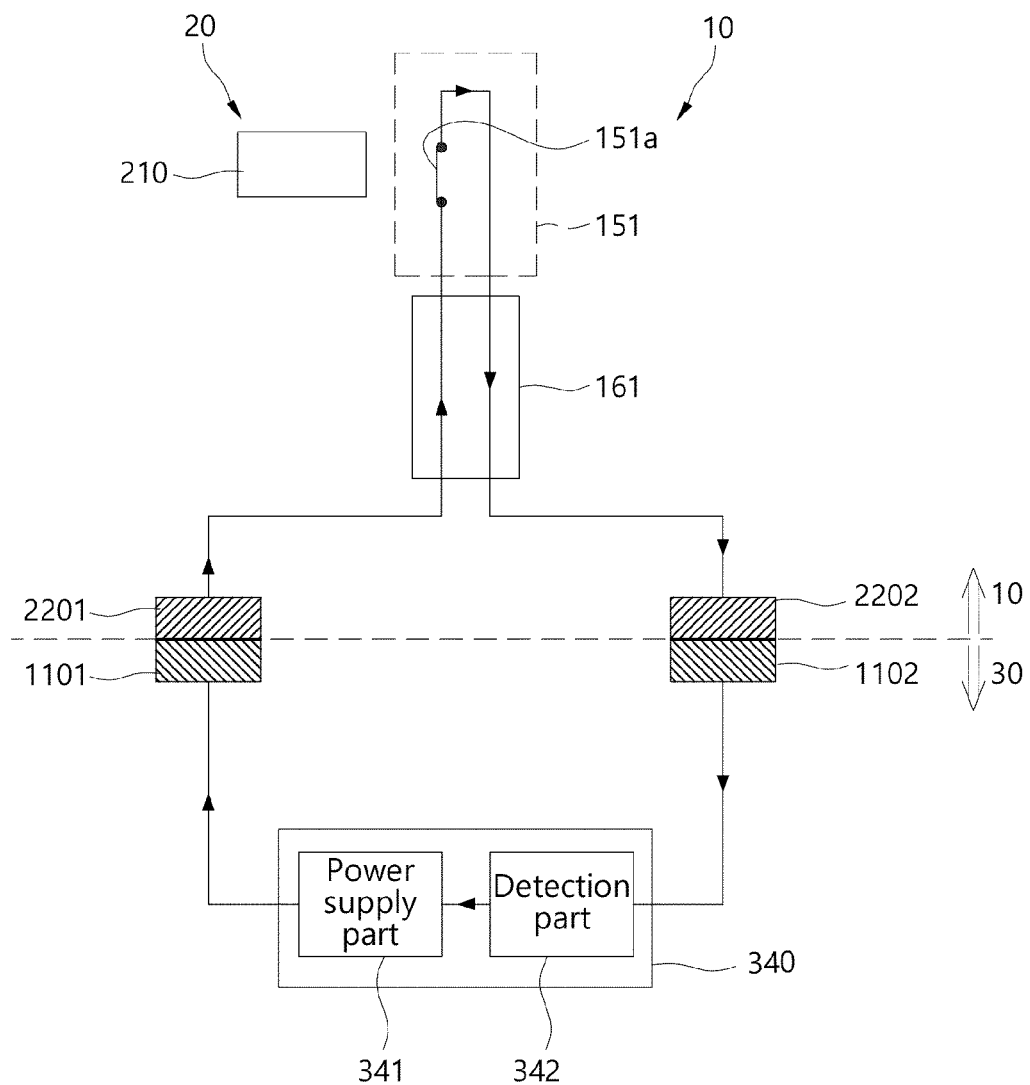
FIG. 15 is an operation diagram according to the closure of the container lid in the equivalent circuit diagram.

FIG. 13 is an equivalent circuit diagram of components for the operation of the blender, FIG. 14 is an operation diagram according to the opening of the container lid in the equivalent circuit diagram, and FIG. 15 is an operation diagram according to the closure of the container lid in the equivalent circuit diagram.

Referring to the drawings, in the main body 30, the first conductor 1101 and the second conductor 1102 may be connected to the control module 340. The control module 340 may include the power supply part 341 and the detection part 342.

The power supply part 341 may supply current to the first conductor 1101, and the detection part 342 may detect current transmitted through the second conductor 1102.

In the container body 10, the third conductor 2201 and the fourth conductor 2202 may be connected in series with the detection module 151. The detection module 151 may include the switch 151a. In the embodiment, the switch 151a may include the reed switch.

When the container lid 20 of the container body is closed, the detection module 151 may detect the triggering member 210 mounted to the inside of a surface of the container lid 20. In the embodiment, the detection module 151 may determine the current transmission between the first and second conductor sets 1100 and 2200 according to whether the triggering member 210 is detected.

Specifically, in the embodiment, when the detection module 151 detects the triggering member 210, current transmission between the first and second conductor sets 1100 and 2200 may be performed, and when the detection module 151 does not detect the triggering member 210, current transmission between the first and second conductor sets 1100 and 2200 may not be performed.

In the embodiment, the third and fourth conductors 2201 and 2202 may be connected to the detection module 151 through the conductive member 161 made of a transparent material.

The operation of such an equivalent circuit diagram will be described.

As illustrated in FIG. 14, in a state in which the container lid 20 does not close the container body 10, the detection module 151 may not detect the triggering member 210, so the turn-off state of the switch 151a may be maintained.

In the state in which the switch 151a is turned off, the control module 340, the first conductor 1101, the third conductor 2201, the switch 151a, and the fourth conductor 2202 may not formed a closed circuit, so current transmission may not be performed between the first conductor 1101 and the third conductor 2201 and between the second conductor 1102 and the fourth conductor 2202.

As illustrated in FIG. 15, when the container lid closes the container body 10, the triggering member 210 may approach the detection module 151 within a predetermined distance, and the switch 151a may be turned on by the triggering member 210.

When the switch 151a is turned on, the control module 340, the first conductor 1101, the third conductor 2201, the switch 151a, and the fourth conductor 2202 connected in series to each other may form a closed circuit.

When such a closed circuit is formed, current transmission may be performed between the first conductor 1101 and the third conductor 2201, and between the second conductor 1102 and the fourth conductor 2202.

That is, in this case, the power supply part 341 of the control module 340 may supply current to the first conductor 1101, and the current may be transmitted from the first conductor 1101 to the third conductor 2201, and continuously, the current may flow through the switch 151a, the fourth conductor 2202, the second conductor 1102, and the detection part 342. The detection part 342 may detect the current flowing through the second conductor 1102.

Figure 16:
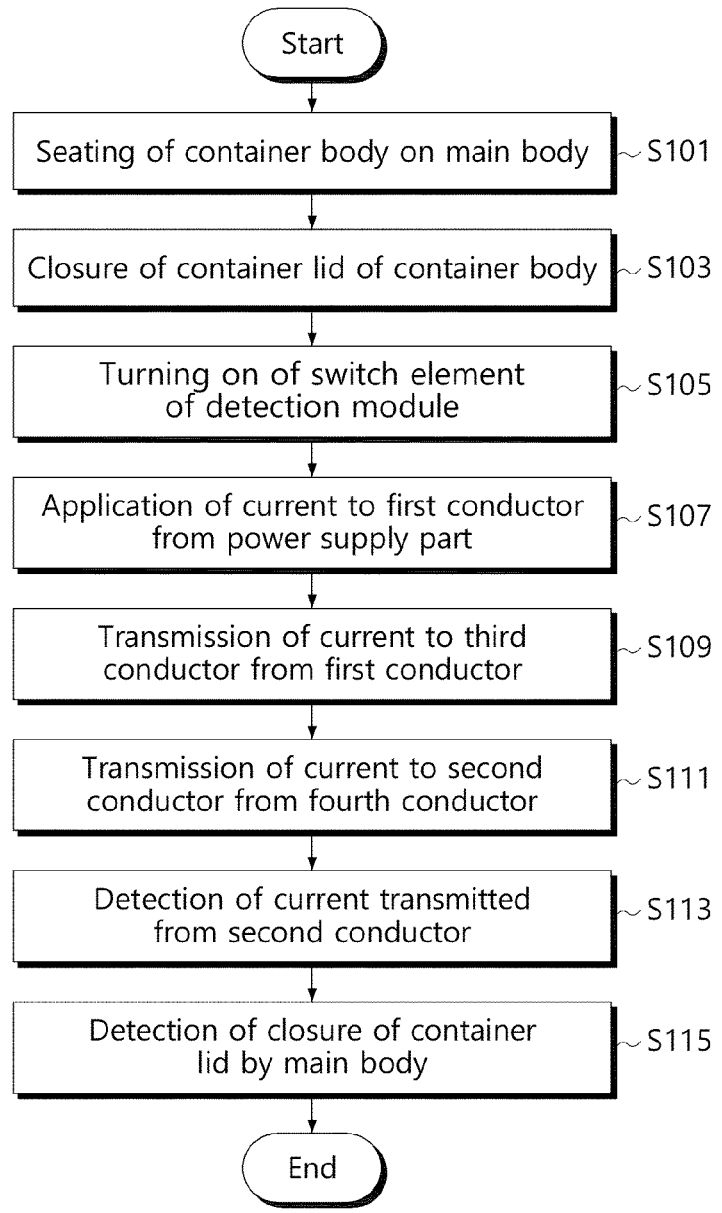
FIG. 16 is a flowchart illustrating the process of detecting the closure of the container lid of the container body in the main body according to the embodiment of the present disclosure.

FIG. 16 is a flowchart illustrating the process of detecting the closure of the container lid in the main body according to the embodiment of the present disclosure.

Referring to FIG. 16, in the blender 1 according to the embodiment, when the container lid 20 closes the container body 10 at S103 after the container body 10 is seated on the main body 30 at S101, the switch 151a of the detection module 151 may be turned on by the triggering member 210 mounted inside a side surface of the container lid 20 at S105.

When the switch 151a is turned on, the power supply part 341, the first conductor 1101, the third conductor 2201, the switch 151a, the fourth conductor 2202, and the detection part 342 may form a closed circuit such that current can be supplied to the first conductor 1101 by the power supply part 341 at S107.

The current supplied to the first conductor 1101 may be transmitted to the third conductor 2201 in contact with the first conductor 1101 at S109, and may be continuously transmitted to the second conductor 1102 through the switch 151a and the fourth conductor 2202 at S111.

The detection part 342 may detect the current transmitted from the second conductor 1102 at S113.

Accordingly, when the current is detected by the detection part 342, the control module 340 of the main body may detect that the container lid 20 of the container body 10 is closed at S115.

The embodiments of the present disclosure have been described above with reference to the accompanying drawings, but the blender of the present disclosure is not limited to the above embodiments and may be manufactured in a variety of different forms. Those skilled in the art to which the present disclosure belongs will understand that the blender of the present disclosure may be embodied in other specific forms without changing the spirit or essential features of the present disclosure. Therefore, it should be understood that the embodiments described above are illustrative in all respects and not restrictive.

The invention claimed is:

1. A blender comprising:
   a main body comprising a first conductor set, and a control module to supply current to the first conductor set and to detect the current received from the first conductor set; and
   a container body comprising a second conductor set in contact with the first conductor set of the main body when the container body is seated on the main body, and a detection module to allow the current to transmit between the first and second conductor sets based on a state of the detection module,
   wherein the first conductor set comprises a first conductor and a second conductor, and the second conductor set comprises a third conductor and a fourth conductor,
   wherein, in a state in which the container body is seated on the main body, the first conductor and the third conductor are in contact with each other in at least a portion thereof, and the second conductor and the fourth conductor are in contact with each other in at least a portion thereof, wherein the current is transmitted from the first conductor to the third conductor in contact with the first conductor, and the current is transmitted from the fourth conductor to the second conductor in contact with the fourth conductor.

2. The blender of claim 1, wherein the control module comprises:
a power supply part to supply the current to the first conductor, and
a detection part to detect the current received from the second conductor.

3. The blender of claim 2, wherein the main body further comprises a reed switch to detect whether the container body is seated,
whether the power supply supplies the current to the first conductor when a closure of a container lid at the container body is detected in a state in which the reed switch detects the seating of the container body.

4. The blender of claim 2, comprising:
a container lid having a triggering member, wherein the detector operates to transmit the current between the first and second conductor set when the triggering member is within a predetermined distance range of the detector to change the state of the detector.

5. The blender of claim 4, wherein the detection module comprises a switch that changes from a turn-off state to a turn-on state according to a distance from the detection module.

6. The blender of claim 5, wherein when the switch is turned on, the current is transmitted from the first conductor to the third conductor, and the current is transmitted from the fourth conductor to the second conductor.

7. The blender of claim 5, wherein the switch and the first and second conductors are electrically connected to each other through a transparent conductive member, and the conductive member is disposed in a longitudinal direction of the container body from an upper part of the container body to a lower part thereof.

8. The blender of claim 7, wherein the conductive member comprises a transparent electrode film.

9. The blender of claim 7, wherein a first end of the transparent electrode film is electrically connected to the switch by a first connector which is detachable from the transparent electrode film, and a second end of the transparent electrode film is electrically connected to the second conductor set by a second connector which is detachable from the transparent electrode film.

10. The blender of claim 9, wherein the first connector comprises a protrusion from the switch to receive the first end of the transparent electrode film.

11. The blender of claim 9, wherein the second connector comprises a protrusion from the second conductor set to receive the second end of the transparent electrode film.

12. The blender of claim 5, wherein the switch is a reed switch, and the triggering member is a magnetic body.

13. The blender of claim 1, wherein the first to fourth conductors are comprised of metal conductors.

14. The blender of claim 1, wherein the first to fourth conductors are comprised of conductive rubbers.

15. The blender of claim 1, wherein the first and second conductors are comprised of conductive rubbers, and the third and fourth conductors are comprised of metal conductors.

16. The blender of claim 1, wherein the first conductor is configured to have a ring shape on an upper surface of the main body, and the second conductor is disposed inside or outside of the ring shape of the first conductor and is configured to have a ring shape on a same surface of the main body as the first conductor such that the second conductor has a same center point as the first conductor.

17. The blender of claim 16, wherein the third conductor is configured to have a ring shape on an lower surface of the container body, and the fourth conductor is disposed inside or outside of the ring shape of the third conductor and is configured to have a ring shape on a same surface of the container body as the third conductor such that the fourth conductor has a same center point as the third conductor.

* * * * *